United States Patent [19]

Cannon

[11] Patent Number: 4,674,092
[45] Date of Patent: Jun. 16, 1987

[54] MINIATURE CRYOGENIC PUMP METHOD AND APPARATUS FOR ION LASERS

[75] Inventor: Jeffrey L. Cannon, Sunnyvale, Calif.

[73] Assignee: Coherent, Inc., Palo Alto, Calif.

[21] Appl. No.: 715,655

[22] Filed: Mar. 25, 1985

[51] Int. Cl.⁴ ............................................. H01S 3/13
[52] U.S. Cl. ...................................... 372/33; 372/34; 372/4; 372/69; 372/59
[58] Field of Search .................. 372/4, 69, 59, 34, 33, 372/55, 58; 62/55.5

[56] References Cited

U.S. PATENT DOCUMENTS

| | | | |
|---|---|---|---|
| 3,560,789 | 2/1971 | Hernqvist | 372/59 |
| 3,566,304 | 2/1971 | Neusel et al. | 372/59 |
| 3,789,320 | 1/1974 | Hepburn | 372/59 |
| 4,068,196 | 1/1978 | Hohta et al. | 372/59 |
| 4,229,709 | 10/1980 | McMahan | 372/59 |
| 4,316,157 | 3/1982 | Dosi et al. | 372/59 |
| 4,457,001 | 6/1984 | Sepp et al. | 372/59 |
| 4,550,409 | 10/1985 | Kaye | 372/59 |
| 4,580,268 | 4/1986 | Barr, Jr. et al. | 372/55 |

OTHER PUBLICATIONS

McKnight et al; "Laser Action at 3 μm in a Hydrogen Discharge", Appl. Opt., vol. 21, No. 3, 1 Feb. 1982, p. 357.

Primary Examiner—Leon Scott, Jr.
Attorney, Agent, or Firm—Limbach, Limbach & Sutton

[57] ABSTRACT

A method and apparatus for reducing gas pressure in a laser wherein a miniature cryogenic pump is constructed to comprise an integral part of a laser plasma tube. The pump includes a container which holds molecular sieve material, a conduit which permits communication between the container and the plasma tube, and a valve which controls the communication along the conduit. All connections between the container, conduit, valve and plasma tube are gas-tight so as to maintain the ion integrity of the plasma tube with respect to the atmosphere. In operation, a service engineer immerses the container in a refrigerant, such as liquid nitrogen, and opens the valve until the pressure in the plasma tube reaches the desired level. Thereafter the valve is closed and the container permitted to return to ambient temperature. Further in accordance with the present invention, means are provided for preventing over pressure in the container. In the event that other gases are introduced into the container due to leaks in the pump or plasma tube, a puncturing pin is positioned in relation to a diaphragm, which diaphragm expands into contact with the puncturing pin when there is an over pressure condition in the container.

17 Claims, 6 Drawing Figures

MINIATURE CRYOGENIC PUMP METHOD AND APPARATUS FOR ION LASERS

DESCRIPTION

1. Technical Field

The present invention is directed in general to ion laser plasma tubes and more particularly to reducing excessive gas pressure in ion laser plasma tubes by way of a miniature cryogenic pump which is integrated with an ion laser plasma tube.

2. Background Art

The gas pressure in a laser plasma tube is a key parameter in the design of such a device. The plasma tube voltage is a near linear function of plasma tube pressure at a fixed plasma tube current. The output power of the tube is related to operating pressure of the laser and hence the efficiency and output level at which the laser operates.

When a laser is operated a phenomenon called "sputtering" traps gas molecules in the plasma tube. This in turn causes a decrease in the plasma tube pressure and hence an alteration in the operation of the device. A number of means have been developed to replenish the plasma tube gas pressure such as automatic gas filled systems. In these systems wherein ballast tanks are coupled to the plasma tube and either passively, or under servo control, supply additional gas to the tube to maintain the pressure in the tube at some desired level.

While the above means have been effective to maintain gas pressure, such means do not address the converse problem of excessive gas pressures due to the subsequent evolution of the trapped gas molecules. This release of the trapped molecules is caused by changes in operating conditions of the laser. For example, krypton lasers often operate under different sets of conditions. For example, depending upon the particular application, the krypton laser can be operated with one magnetic field setting to provide lines, or wavelengths, in the infrared spectrum, or can be operated with a different magnetic field to provide lines, or wavelengths, in the ultraviolet spectrum. It is often the case that gas molecules which are trapped by sputtering under one set of operating conditions will often be released when the laser is operated under a different set of conditions.

In the past, such excessive pressure conditions have been remedied by the use of sealed valves on the plasma tube which permit access by a portable cryogenic pump. The pump is, from time to time, mechanically coupled to the plasma tube to pump out a portion of the gas in the tube to reduce pressure therein. Once the required amount of gas has been removed the coupling valve is resealed and the portable cryogenic pump is decoupled from the valve. Attendant costs associated with this technique can be substantial.

A further disadvantage of the prior system is the potential for operator error in connection of the pump to the sealed valves and operation thereof. For example, should the operator open the cryovalve to the atmosphere the vacuum processed laser tube would be destroyed. Further, each time the valve is opened, there is always the potential of introducing contaminents to the tube thereby shortening its life. Sputter ion pumps have also been used to reduce the pressure in ion laser plasma tubes, but they are better suited to pumping at pressures well below those used in this type of plasma tube.

It is therefore highly desirable to provide means for pumping down a plasma tube without compromise of the tube itself, where such means are small in size, an integral part of the laser tube, and easy to use.

DISCLOSURE OF THE INVENTION

These and other problems and disadvantages of previous arrangements for pumping down plasma tubes are overcome by the present invention of a method and apparatus for reducing gas pressure in a gas-type laser system which apparatus is integrated with the plasma tube. The apparatus includes molecular sieve material and means for containing the molecular sieve material. Conduit means connect the plasma tube to the containing means to permit communication between the interior of the plasma tube and the interior of the containing means. Also provided are means coupled to the conduit means for regulating communication along the conduit means. The plasma tube, the containing means, the conduit means, and the regulating means form an integral structure which is sealed to the atmosphere.

In operation the service engineer refrigerates the containing means by immersing the containing means in a refrigerant, such as liquid nitrogen. This cools the molecular sieve material such that the cooled material acts as a gas trap. This causes gas molecules to be drawn out of the plasma tube and hence a reduction in the gas pressure of the tube. The regulating means is operated by the service engineer to regulate the pumping action. A means to monitor tube pressure is incorporated on the plasma tube. Since the pump assembly is metallic and at tube voltage potential, the tube pressure should be adjusted while the plasma tube is off. Therefore the service engineer can determine when the tube pressure has reached the desired level by monitoring the tube cold pressure which correlates to optimum operating voltage. The operator can then close the regulating means to stop the pumping operation.

The above structure has several advantages including high efficiency, small size, sealibility for vacuum processing, low lifetime costs, minimal parts, and ease of operation.

The present invention further includes means for remedying over pressure conditions in the pump. Because the molecular sieve material is an efficient gas pump, other gases such as air can be pumped by the molecular sieve material in the event that a leak forms in the system. In such an event, the air will expand when the molecular sieve material is brought back to room temperature. Such expansion can produce excessive pressures in the pumping system. This, in turn, can result in the rupturing of the molecular sieve container or other portions of the pump. In order to avoid such a condition, means are provided for venting the molecular sieve material container in the event that the pressure therein exceeds a safe level. Means are provided in the container which flex under pressure. Puncturing means are positioned adjacent the flexing material means so that when the material flexes beyond a point which corresponds to pressures in excess of a safe level, the puncturing means will puncture the flexible portion and thereby open the interior of the molecular sieve container to the atmosphere.

It is therefore an object of the present invention to provide an integrated miniature cryogenic pump for use with a laser plasma tube.

It is another object of the present invention to provide a system for reducing gas pressure in a laser which is small in size and simple to operate.

It is a further object of the present invention to provide an integral pump for reducing the gas pressure in a plasma tube which pump includes molecular sieve material means for permitting communication between the molecular sieve material and the interior of the plasma tube, and means for regulating the communication between the plasma tube interior and the molecular sieve material.

It is still another object of the present invention to provide a laser system which has an integrated gas pressure reduction apparatus and which further includes means for relieving over pressure conditions in said gas pressure apparatus.

These and other objectives, features and advantages of the present invention will be more readily understood upon consideration of the following detailed description of certain embodiments of the present invention and the accompanying drawings.

DETAILED DESCRIPTION OF THE BEST MODE OF THE INVENTION

Figure 1:
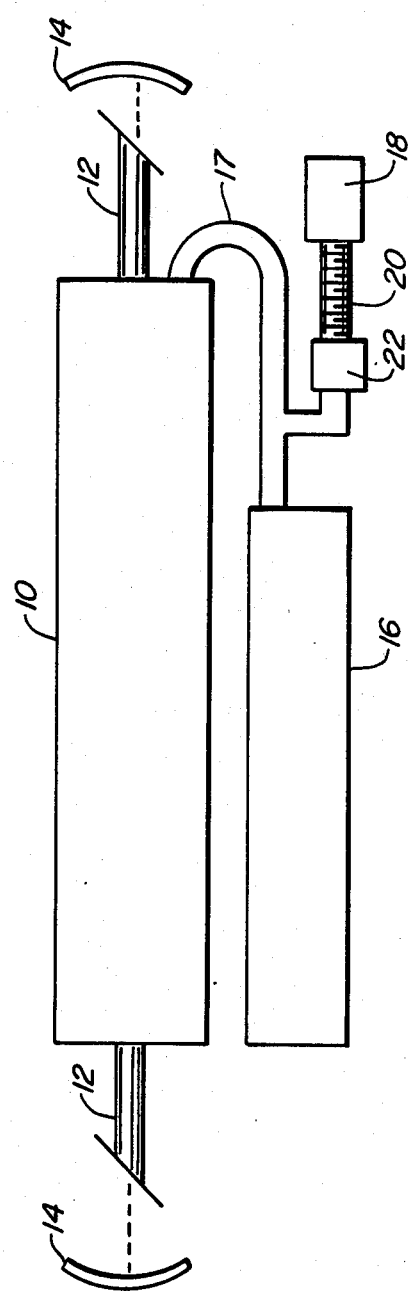
FIG. 1 illustrates the relationship of the pump of the present invention to the laser plasma tube.

Referring to FIG. 1, a laser system typically has a plasma tube 10 which contains a lasing gas, such as krypton or argon, excitation circuitry (not shown) for inducing and sustaining the lasing action of the gas, and optical windows 12 which permit the generated photons to immerge from the plasma tube 10 and to impinge upon reflecting surfaces 14 which form the resonant cavity of the laser. Typical plasma tubes can also include a ballast tank and/or a gas recharge system 16 by which the gas within the plasma tube 10 can be replenished. Reference is made to U.S. Pat. Nos. 3,619,810 and 4,376,328 wherein additional detail regarding plasma tubes and laser systems in general is provided. This reference is hereby incorporated by reference to such extent.

In accordance with the present invention, a miniature cryogenic pump is provided which is formed as an integral part of the plasma tube 10, and which permits the plasma tube 10 to be "pumped down". It is envisioned that the pump of the present invention can be utilized by qualified service engineers. In operation the service engineer immerses the container portion 18 in a refrigerant, such as liquid nitrogen. Molecular sieve material is contained within container 18. When the sieve material is cooled to a sufficient temperature, such as 77° K. for zeolite, the molecular sieve material captures the gas molecules of interest.

Thus where the lasing gas is krypton, for example, and zeolite is the molecular sieve material, the cooled zeolite will begin trapping krypton molecules and, as such, produce a pumping action which draws the krypton molecules from the plasma tube 10. A conduit 20 which is preferably flexible, permits communication between the interior of plasma tube 10 and container 18. Valve 22 enables the user to open or close off communication along conduit 20.

As shown in FIG. 1, communication between the plasma tube 10 and container 18 can be established by way of conduit 20 and conduit 17. Conduit 17 can be the pre-existing conduit by which the gas recharge system 16 is communicatively coupled to plasma tube 10. Alternatively, container 18 can be coupled directly to plasma tube 10 by way of conduit 20. The coupling structure shown in FIG. 1 is preferred in that a pre-existing path to the plasma tube 10 can be used thereby eliminating the need for a separate pumping port at plasma tube 10.

Figure 2:
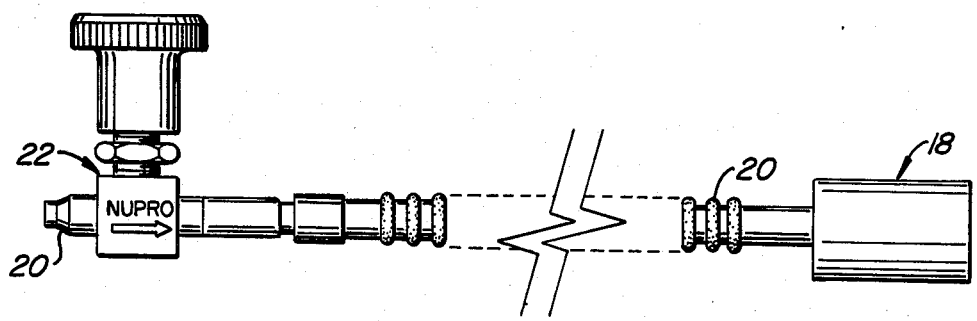
FIG. 2 illustrates the pump portion of the present invention.

Referring to FIG. 2, a more detailed illustration of the pump section is shown. Container 18 need not be very large in physical size due to the high efficiency of the molecular sieve material. For example, in a pump constructed in accordance with the preferred embodiment of the present invention a capacity of approximately 500 torr·liter is provided. This is approximately one thousand times the amount of gas present for normal operations. Tests have revealed that the pumping rate of such a configuration against an approximate 3.0 liter volume of gas, is, on the average, 0.155 torr·liter per minute.

As mentioned above, conduit 20 is preferably flexible to permit the service engineer to maneuver the container 18 for immersion in the refrigerant. Preferably, conduit 20 is a flexible tubing constructed of material which can withstand baking up to temperatures of 400° C. in an ultra high vacuum environment. Preferably this material is stainless steel type 304.

Valve 22 is of the type wherein the transmission path is fully isolated from the atmosphere. In such a configuration, the actuating portion should be isolated from the transmission path. One such suitable valve is the bellows valve manufactured by Nupro of Willoughby, Ohio. In the preferred embodiment of the present invention Nupro Model No. SS-4H-TH3 can be utilized.

Preferably, all couplings and junctions are welded, such as by heliarc welds, so that no leaks are detected when checked on a helium leak detector having a sensitivity of at least $10^{-9}$ cubic centimeters per second.

Figure 3:
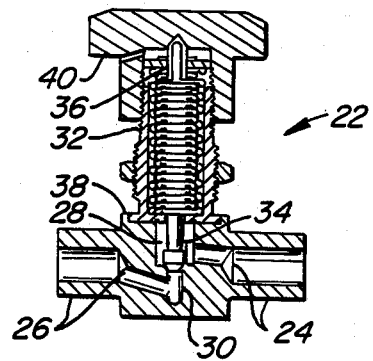
FIG. 3 is a cross-sectional illustration of the valve portion of the present invention.

Referring to FIG. 3, a cross-section of a bellows valve is shown. An entrance port 24 and an exit port 26 communicate with an inner chamber 28 and passageway 30. A bellows 32 is positioned at one end of chamber 28 and attached to a pin 34. Deformation of bellows 32 as caused by an actuator 36 causes pin 34 to block passageway 30. When the deforming force is removed from bellows 32, pin 34 is drawn clear of passageway 30 and flow is permitted between input port 24 and output port 26. Diaphragm 32 is attached to the walls of the valve body 38 so that a gas-tight junction is provided. Thus, there is true isolation of the flow path in the valve from the atmosphere. The actuator 36 can be changed in position by the screw cap 40 or some other suitable arrangement.

Figure 4:
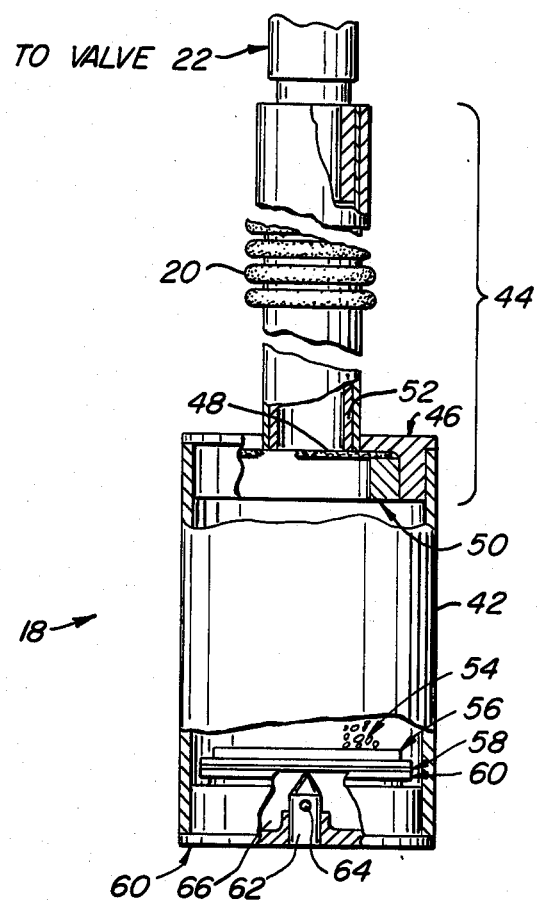
FIG. 4 is a cross-sectional drawing of the molecular sieve container portion of the present invention and of the overpressure protection structure.

Referring now to FIG. 4, the preferred embodiment of the container 18 will now be described in greater detail. The body 42 of the container 18 is formed from a seamless stainless steel type 304 tube. A top cap assembly 44 includes the flexible tubing 20. Flexible tubing 20 can be a 0.375 inch diameter flexible stainless steel tube manufactured by Cajon Corporation of Macedonia, Ohio. One end of tube 20 is welded to a stainless steel cap 46. A filter, such as a fine mesh stainless steel screen 48, is confined between cap 46 and retaining ring 50. Retaining ring 50 is then spot welded to cap 46. A weld ring 52 is positioned within the end of flexible tube 20 that is welded to cap 46.

Screen 48 acts to prevent migration of the molecular sieve material 54 into the plasma tube 10.

The bottom portion of container 18 is constructed as follows. A weld adapter ring 56 is placed on one surface of a disc 58. Disc 58 acts as the diaphragm which expands under excessive pressure. In the preferred embodiment of the present invention the disc is 0.002 inch thick stainless steel type 302.

A bottom cap 60 is placed on the opposite surface of disc 58. The outside diameter of all three surfaces is then welded. Bottom cap 60 is welded at its outer diameter to the inner surface of body 42.

The interior of bottom cap 60 forms a chamber which houses pin 62. Pin 62 is a point-sharp stainless steel pin. Pin 62 has passageways 64 which are drilled along the diameter of the pin. Preferably two such passageways are provided at 90° to one another. A further passageway is drilled from the bottom of the pin along the major access of the pin until the passageway intersects the passageways 64. Thus, a flow path is formed from the atmosphere to the chamber 66 defined by the interior of bottom cap 60. The pin 62 is positioned on the bottom cap so that its point just touches disc 58. Pin 62 is welded into position.

Figure 5A:
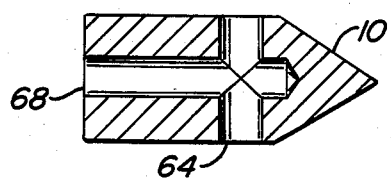
FIGS. 5A and 5B are cross-sectional and plan views of the puncturing pin of the present invention.
Figure 5B:
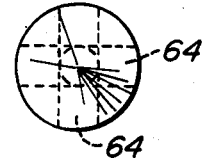

Referring to FIG. 5A and 5B the passageways within pin 62 can be more clearly seen. In FIG. 5A it can be seen that passageway 64 lies along the diameter of the pin, while the passageway 68, lying along the major axis of the pin, extends to intersect with passageway 64. FIG. 5B shows that passageways 64 are provided, in the preferred embodiment of the present invention, at 90° angles to one another.

In operation, the molecular sieve material 54 is contained within the chamber defined by body 42 in the region between top cap 44 and bottom cap 60. When assembled with the plasma tube 10, the pump forms an integral assembly with the plasma tube 10. Because the material within the pump can withstand baking temperatures of 400° C. in an ultra high vacuum environment, the plasma tube 10 and the pump can be vacuum processed together as an integrated unit.

The service engineer need no longer transport a portable cryogenic pump around the country in connection with his or her service calls. To service a plasma tube having a pump of the present invention the service engineer need only have access to a refrigerant, such as liquid nitrogen. This refrigerant is often readily available at the installations where most lasers are located. The service engineer, after removing the laser outer cover can reorient the container 18. The container 18 is then immersed in liquid nitrogen, for example. The liquid nitrogen can be easily housed in a styrofoam cup, for example. After allowing time for the seive material to cool to 77° K. the valve 22 may be opened and the tube pressure reduced. Pressure may be monitored directly using the pressure sensor included as part of the tube.

As discussed above, should a leak occur in the plasma tube or pump portion, it is possible that other gas, such as air, will be drawn into container 18. When this gas returns to ambient temperature, the pressure inside container 18 may increase to a level which would cause container 18 to rupture. In order to overcome this problem, pin 62 is provided. If the pressure in container 18 becomes too great, disc 58 will expand against pin 62. The sharpened point of pin 62 will puncture disc 58 and permit gas to escape through the puncture and into chamber 66, and then to the atmosphere through passageways 64 and 68. The positioning of passageway 64 along the diameter of pin 62 aids in preventing escape of the molecular sieve material into the atmosphere.

In summary, the pump of the present invention provides many advantages over previous arrangements for regulating the gas pressure in a plasma tube. High efficiency is provided, as discussed, and the pump is small in size. For example, in the preferred embodiment to the present invention the diameter of body 42 can be 1 inch. The height of body 42 can be approximately 1½ inches. This translates to a capacity of approximately 9 grams of porous zeolite. The flexible tube 20 is preferably 6 inches long and the valve 22 occupies less than 2 inches square of space.

As discussed above, since all parts of the pump are preferably stainless steel the pump can be preassembled and installed into the plasma tube 10. This integrated assembly can then be baked up to temperatures of 400° C. in an ultra high vacuum environment.

The pump of the present invention eliminates the need to transport a pump around the country and also eliminates any waiting time associated with delivery of a portable pump. Further, there is little or no potential for operator error in opening any valves of the pump system. Since the pump is closed to the atmosphere the ion integrity of the plasma tube will remain intact during the entire pumping operation. Further, the pump of the present invention requires few parts and thus is simple and inexpensive to manufacture and utilize.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed.

I claim:

1. An apparatus for reducing gas pressure in a gas tight laser system of the type including a plasma tube which contains a volume of lasing gas at a gas pressure, comprising molecular sieve material cryogenically cooled to a temperature such that said sieve material traps said lasing gas thereby producing a pumping action which draws said lasing gas from said plasma tube;
means for containing the molecular sieve material;
conduit means connecting the plasma tube and the containing means for permitting communication between the interior of the plasma tube and the interior of the containing means; and
means coupled to the conduit means for regulating communication along the conduit means, wherein the plasma tube, the containing means, the conduit means and the regulating means form an integral structure which is sealed to the atmosphere.

2. The apparatus of claim 1 wherein the regulating means include a bellows valve.

3. The apparatus of claim 1 wherein the regulating means include a valve.

4. The apparatus of claim 3 wherein the valve is manually operable.

5. The apparatus of claim 1 wherein at least a portion of the conduit means comprise flexible tubing.

6. The apparatus of claim 1 wherein the molecular sieve material includes porous zeolite.

7. The apparatus of claim 1 wherein the containing means include
a body which defines a chamber, wherein the molecular sieve material is positioned in the chamber and the body has a port which opens into the chamber, and further wherein the conduit means are coupled to the port.

8. The apparatus of claim 7 further including filter means positioned at the port of the body for retaining the molecular sieve material within the chamber.

9. The apparatus of claim 8 wherein the filter means is a screen.

10. The apparatus of claim 7 wherein the body further includes a
diaphragm portion which is deformable; and
a cylindrical pin having one end which is conically shaped and ends in a point, wherein said cylindrical pin includes an axial bore extending partially into the pin and a transverse bore which extends radially through the cylindrical pin and in communication with the axial bore, and further wherein said cylindrical pin is positioned in a housing which is coupled to the body so that said housing and body form an air tight chamber but for the passage way defined by the radial and axial bores in the cylindrical pin.

11. An apparatus for reducing gas pressure in a gas tight laser system of the type including a plasma tube which contains a volume of gas at a gas pressure, comprising molecular sieve material cryogenically cooled to a temperature such that said sieve material traps said lasing gas thereby producing a pumping action which draws said lasing gas from said plasma tube;
means for containing the molecular sieve material, wherein the containing means include
a body which defines a chamber, wherein the molecular sieve material is positioned in the chamber and the body has a port which opens into the chamber, and further wherein conduit means are coupled to the port; and
wherein the body includes a portion which is deformable above a predetermined pressure, and further including means positioned adjacent the deformable portion for puncturing the deformable portion when said portion deforms a predetermined amount;
conduit means connecting the plasma tube and the containing means for permitting communication between the interior of the plasma tube and the interior of the containing means; and
means coupled to the conduit means for regulating communication along the conduit means, wherein the plasma tube, the containing means, the conduit means and the regulating means form an integral structure which is sealed to the atmosphere.

12. The apparatus of claim 11 wherein the puncturing means comprise an elongate member having a pointed end wherein said elongate member is positioned in fixed relation to the body and with pointed end abutting against the deformable portion.

13. A method for reducing gas pressure in a gas tight laser system of the type including a plasma tube which contains a volume of lasing gas at a gas pressure comprising the steps of
confining cryagenically cooled molecular sieve material in a container;
coupling the container to the plasma tube so that the container forms an integral part of the gas tight laser system which is sealed to the atmosphere and so that the molecular sieve material is in communication with the plasma tube;
refrigerating the container so that said molecular sieve material operates as a cryogenic pump thereby producing a pumping action which draws said lasing gas from said plasma tube; and
controlling communication between the container and the plasma tube so that the gas pressure in the plasma tube achieves a desired level.

14. The method of claim 13 wherein the coupling step includes the step of positioning a bellows valve between the container and the plasma tube and the controlling step includes the step of operating the bellows valve between a closed and an open position to alternatively block and permit communication between the container and the plasma tube.

15. The method of claim 13 wherein the refrigerating step includes the step of immersing the container in liquid nitrogen.

16. The method of claim 13 further including the step of providing means for releasing excessive pressure in the container.

17. An improved laser system of the type including a plasma tube which contains a volume of lasing gas at a gas pressure, means for exciting the plasma tube so that a discharge is generated from the plasma tube, and means for resonating the discharge from the plasma tube, the improvement comprising
pump means integrally coupled to the plasma tube for pumping the lasing gas from the plasma tube said pump means including
molecular sieve material cryogenically cooled to a temperature such that said sieve material traps said lasing gas thereby producing a pumping action which draws said lasing gas from said plasma tube;
means for containing the molecular sieve material;
conduit means connecting the plasma tube and the containing means for permitting communication between the interior of the plasma tube and the interior of the containing means; and
means coupled to the conduit means for regulating communication along the conduit means, wherein the plasma tube, the containing means, the conduit means and the regulating means form an integral structure which is sealed to the atmosphere.

* * * * *